Aug. 25, 1942.　　　E. JOCHUMSEN　　　2,293,757
CORN HARVESTER
Filed Aug. 3, 1940　　　5 Sheets-Sheet 1
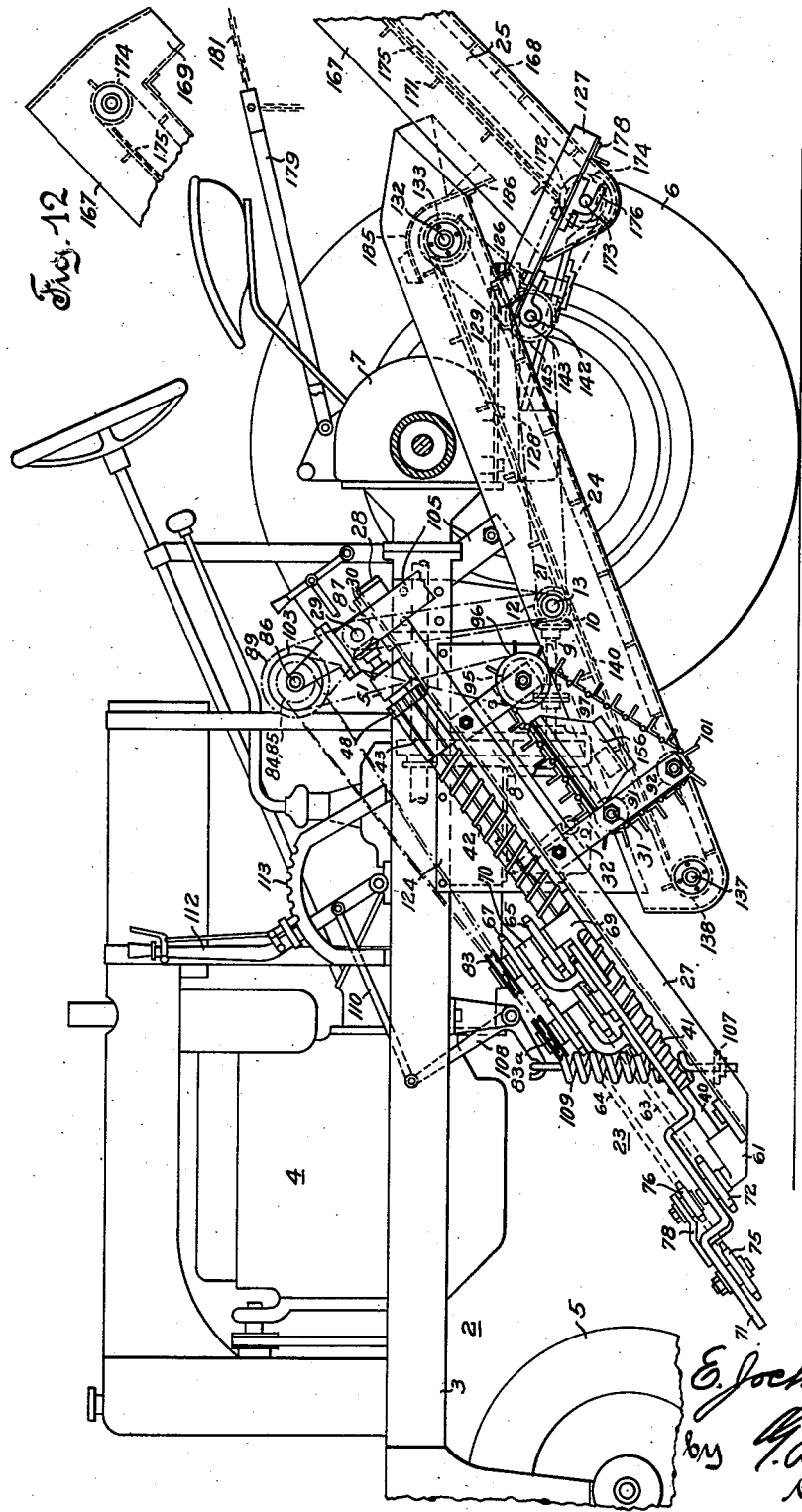

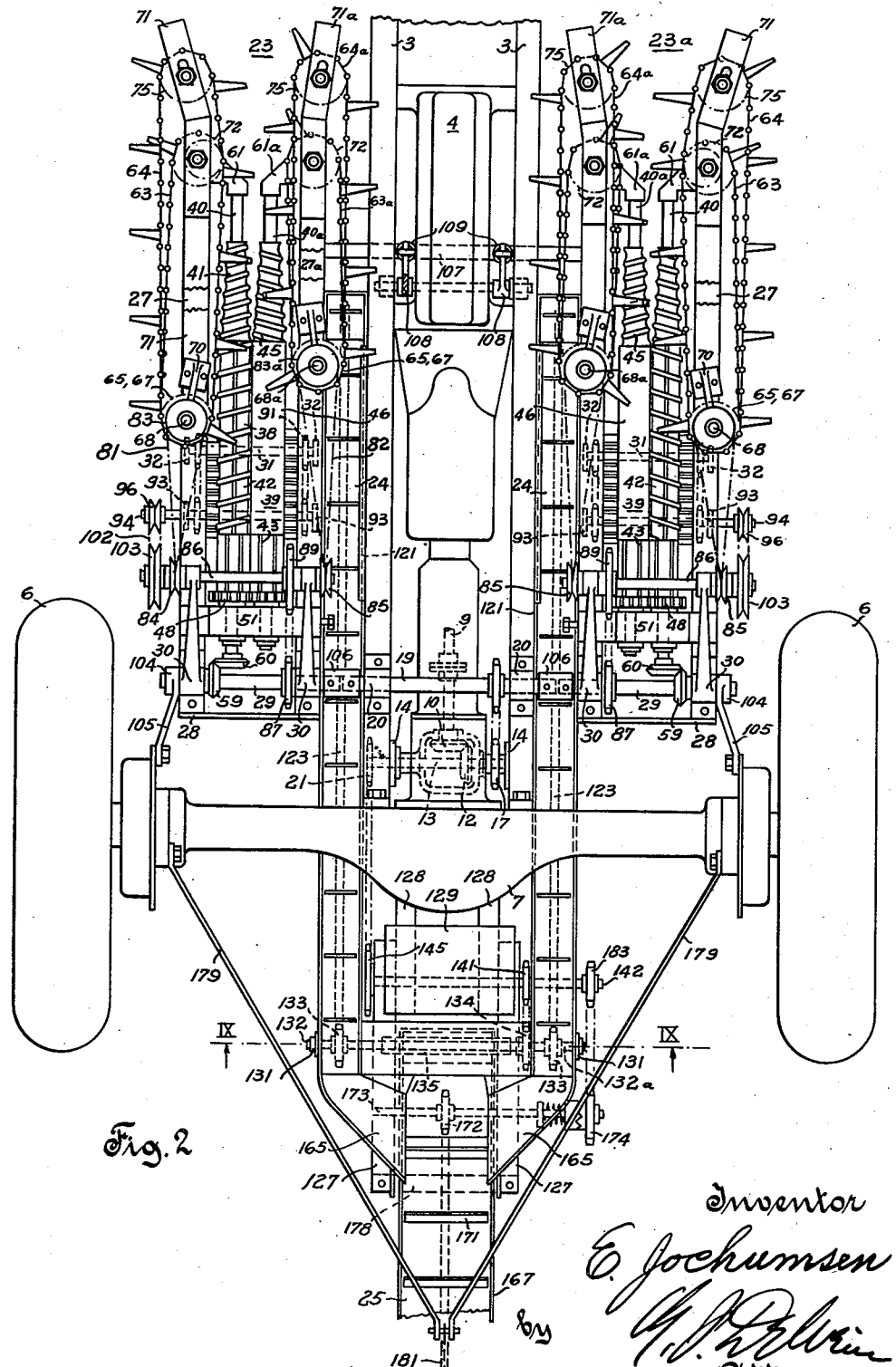

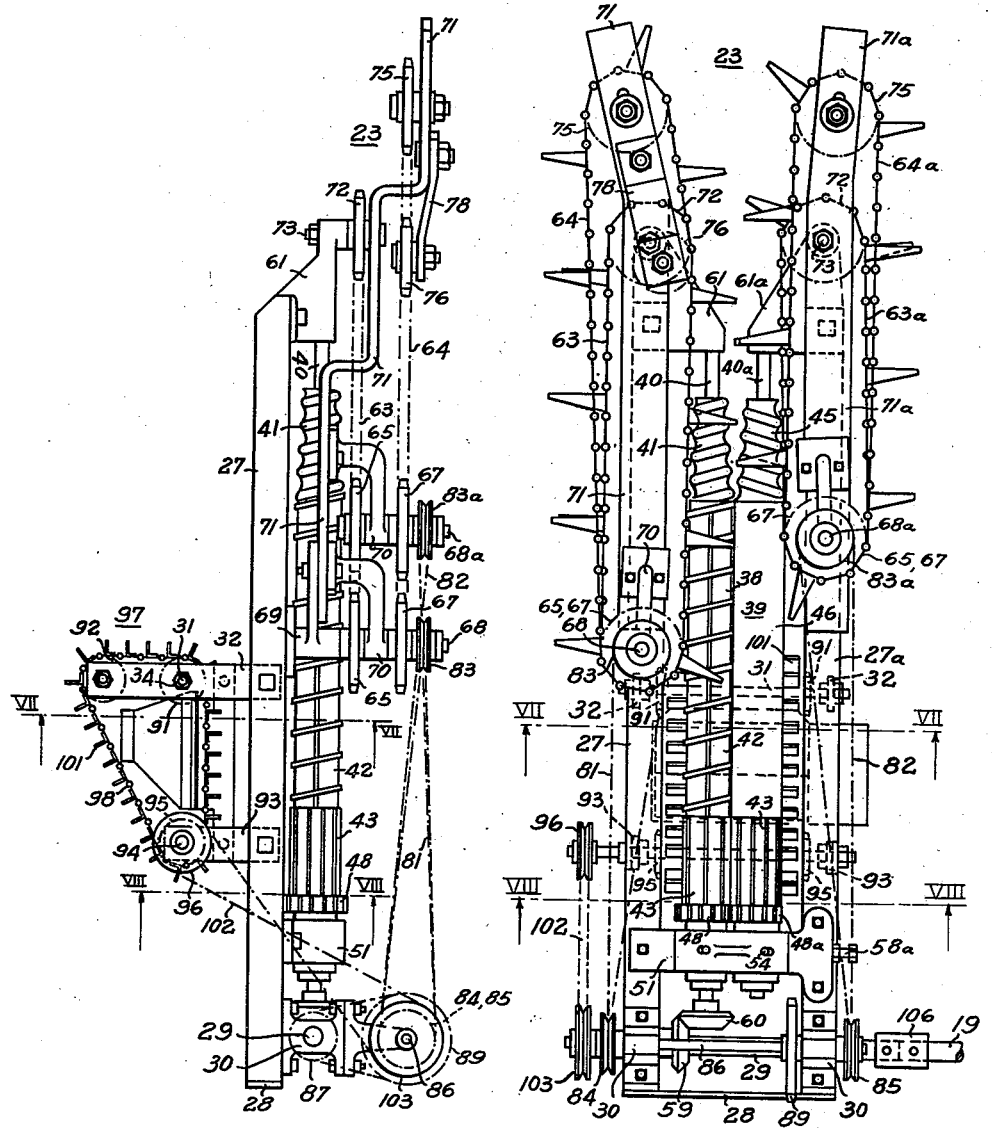

Aug. 25, 1942.  E. JOCHUMSEN  2,293,757
CORN HARVESTER
Filed Aug. 3, 1940  5 Sheets-Sheet 4

Inventor
E. Jochumsen
by
Attorney

Aug. 25, 1942.　　　　　E. JOCHUMSEN　　　　　2,293,757
CORN HARVESTER
Filed Aug. 3, 1940　　　　　5 Sheets-Sheet 5

Inventor
E. Jochumsen
by
Attorney

Patented Aug. 25, 1942

2,293,757

UNITED STATES PATENT OFFICE 2,293,757

CORN HARVESTER

Ed Jochumsen, Waterloo, Iowa, assignor to Allis-Chalmers Manufacturing Company, Milwaukee, Wis., a corporation of Delaware Application August 3, 1940, Serial No. 350,740

29 Claims. (Cl. 56—18)

This invention relates in general to corn harvesters, and various features of the invention are of particular utility in connection with combined picking and husking machines of the type intended for mounting or assembly on a propelling tractor.

Corn harvesters or pickers of commercial types have heretofore been mounted on a wheeled frame to be drawn by horses or a tractor and have also been mounted or assembled on or driven by a tractor; but these prior corn harvesters, particularly such as are designed for mounting on tractors, have disadvantages and defects which militate against their wider commercial acceptance by farmers, particularly farmers working limited acreage. Among these disadvantages of prior commercial types of corn harvesters are the relatively heavy and cumbersome design and construction thereof, a feature which increases the cost of such machines and hence places the machines beyond the means of many farmers operating smaller farms, as well as ordinarily requiring a tractor of relatively high power to insure reasonably satisfactory operation of the harvester. Another disadvantageous feature of prior commercial machines of this type is that a considerable portion of the harvester is disposed so high that it leaves the operator's quarters cramped and obstructed, and this, along with the fact that standing corn stalks are permitted to approach relatively close to the operator's position, considerably impairs his vision of the ground ahead of the machine and the parts of the machine during operation thereof. And further, this relatively cumbersome design of corn harvester, in addition to requiring considerable time and effort to assemble the corn harvester on and dismount the same from a tractor, results in a relatively high center of gravity, with consequent increased vibration and unsteadiness during travel in the field, features which contribute to discomfort of the operator and shortened active life of the machine.

The present invention contemplates the provision of a corn harvesting machine of simple design and construction and light weight, and hence reduced cost, and embodying features which provide for the increased comfort of the operator and better vision of the crop and of the parts of the machine during normal operation, and which facilitate ready assembling of the machine on a conventional type of tractor and removal therefrom in a very short period of time, thus leaving the tractor readily available at any time for other farm operations.

Desirable advantages are attainable in a corn harvesting machine in accordance with the present invention, through providing as features of such a machine one or more picker and husking roll units which, with their necessary drives, are readily and quickly mountable on and demountable from the tractor, along with a readily attachable and detachable conveyer, passing beneath the axle of the supporting traction wheels or the tractor rear axle, for conveying corn rearwardly from the husking rolls to a rearwardly located receptacle or elevating conveyer.

Additional advantages are attainable in accordance with this invention through providing a stalk-bending device located below the picker rolls for cooperation with standing stalks between the rolls to insure bending the latter down in a forward direction as the picker advances through the field, so that the entire corn stalk passes through the rolls at a point relatively close to the ground and thus offers minimum interference with the normal functioning of the husking roll elements, this feature of the invention contributing particularly to permitting a relative low placement of the rolls and the husked corn conveyer, and thus permitting the latter to pass rearwardly beneath the axle of the traction wheels, and hence insuring a relatively low center of gravity of the corn harvester parts when in assembled relation.

An additional feature of advantage of the present invention is concerned with the provision of a resilient bracing arch between the supports for the harvesting rolls and disposed wholly at the underside of such supports and rolls, and including provisions associated with such bracing arch for adjusting the yielding effect of the arch, this placement of the bracing arch contributing to lower the center of gravity of the harvester unit assembly; and an additional advantage is attained through utilizing the bracing arch as a support for the stalk bending device. And a further advantageous feature of the present invention is concerned with the provision of an improved form of shelled corn saving device supported in position below the husking roll elements, and preferably supported through the bracing arch.

A further feature of advantage of this invention is concerned with an improved mounting of the harvesting rolls on and supported through bearings which are resiliently adjustable one relative to another to cause one roll of a pair of cooperative harvesting rolls to be biased to a predetermined position with respect to the other roll but still be free to move away from the latter roll on the occurrence of predetermined pressure between the rolls.

A further feature of the invention is concerned with the provision of an improved power driving connection from the engine of a tractor on which the corn harvester is detachably mounted, such driving connection providing for driving the corn picker rolls and any gathering mechanism associated therewith at a speed which always bears the same proportion to the speed at which the traction wheels of the tractor are driven.

Objects of this invention are to provide a corn harvester and a corn harvester attachment for a tractor, which are of improved design and construction and embodying features contributing to the attainment of the aforesaid structural and operating advantages, individually and collectively, of the invention.

These and other objects and advantages are attained by the present invention, various novel features of which will be apparent from the description herein and the accompanying drawings, disclosing an embodiment of features of the invention, and will be more particularly pointed out in the annexed claims.

In the accompanying drawings:

Fig. 1 is a view in elevation of a corn picker mounted on a tractor and embodying features of the present invention, parts of the apparatus being broken away or removed for facility in disclosure of details;

Fig. 2 is a diagrammatic plan view of the apparatus of Fig. 1, parts being removed and other parts distorted as to position to facilitate disclosure of details;

Fig. 3 is an enlarged plan view of one of the picker-husker units shown in Figs. 1 and 2;

Fig. 4 is a view in elevation of the picker-husker unit as shown in Fig. 3, the view being from the left hand side of Fig. 3;

Fig. 12 is a view in elevation of a detail omitted from Fig. 1; and

Figure 5:
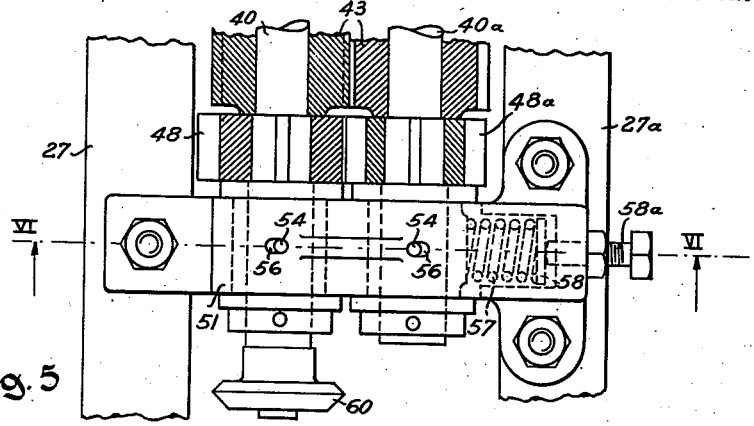
Fig. 5 is a plan view of a detail of the picker unit shown in Figs. 3 and 4.
Figure 6:
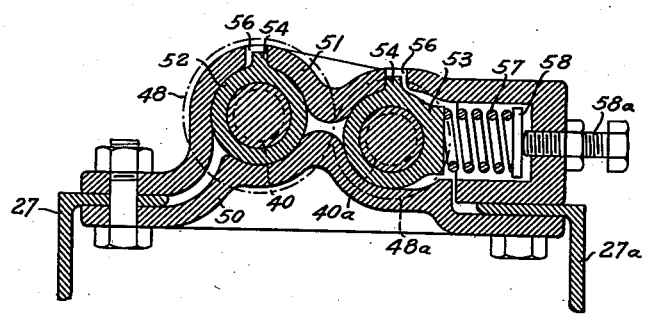
Fig. 6 is a vertical section in the plane of the line VI—VI of Fig. 5.
Figures 7, 8:
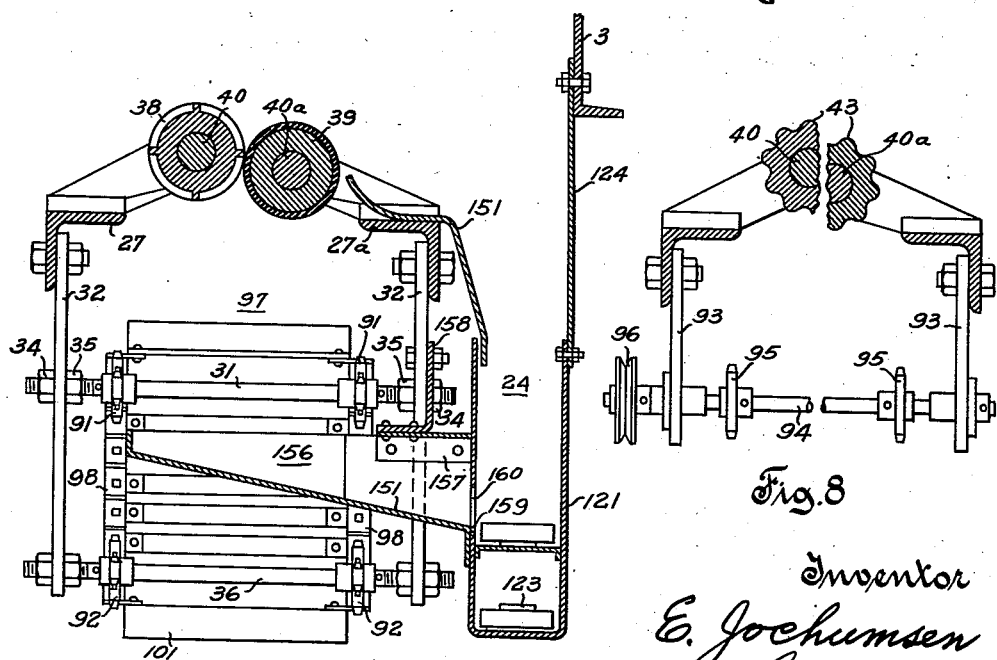
Fig. 7 is a broken sectional view in the plane of the line VII—VII of Figs. 3 and 4, looking forwardly at the unit as shown in Fig. 3, and with the husked corn conveyer in mounted position.
Fig. 8 is a broken sectional view in the plane of the line VIII—VIII of Figs. 3 and 4, looking forwardly at the unit as shown in Fig. 3.
Figure 9:
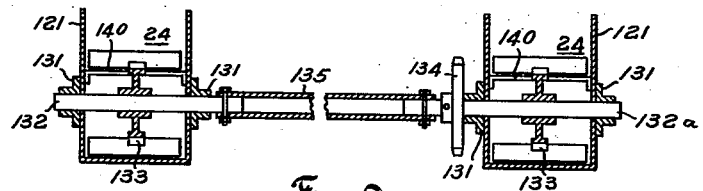
Fig. 9 is a vertical section in the plane of the line IX—IX of Fig. 2.
Figures 10, 11:
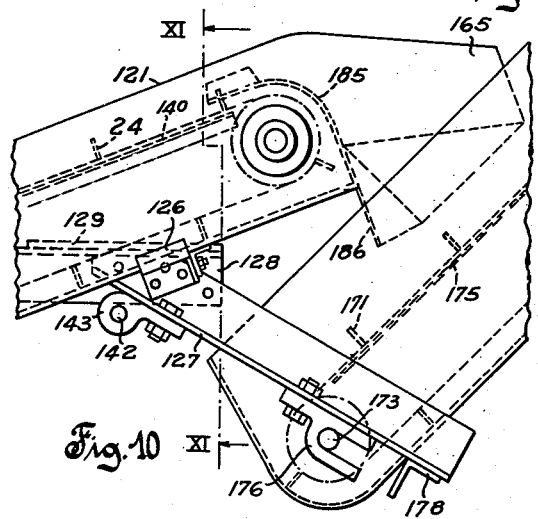
Fig. 10 is an enlarged view in elevation of a detail of Fig. 1.
Fig. 11 is a vertical section of the plane of the line XI—XI of Fig. 10.

In the embodiment of the invention illustrated in the drawings, a conventional form of farm tractor is indicated at 2 and includes a supporting frame having laterally spaced side bars 3 carrying the engine 4 and its radiator and other accessories. The front end of the tractor frame is supported on steerable wheels 5 whose axles are suitably hung from the frame, and the rear end of the frame is supported on traction wheels 6 whose axles are carried by a rear axle housing 7 supported on the rear end of the frame bars 3, this axle housing enclosing a conventional type of differential drive to the traction wheels from the rearwardly extending drive or transmission shaft which is connected to the engine shaft through a conventional variable speed transmission. A separate power takeoff 8 from the transmission shaft, as through a geared connection therewith, is provided and includes a power takeoff shaft 9 for furnishing power to drive the operating parts of the corn picker units and auxiliary conveyers, the driving connection from the transmission shaft being such as to cause the operating parts of the picker to be driven in synchronism or timed relation with the traction wheels of the tractor, to insure efficient operation of the picker mechanism and associated parts.

As indicated, the rear end of the power takeoff shaft 9 is provided with a bevel gear 10 meshing with a bevel gear 12 on a cross shaft 13, the latter being mounted in bearings carried by hangers 14 secured to the side bars 3 of the tractor frame. The bevel gears 10, 12 are enclosed in a housing 15 supported on the bearings of the cross shaft 13, or are independently supported, and the forward portion of the housing 15 provides a rear bearing for the power takeoff shaft 9. The cross shaft 13 is provided with a sprocket 17, the latter serving, through a chain, to drive a sprocket 18 on the cross shaft 19 rotatably and removably supported in bearings 20 on the upper side of the tractor frame bars 3, and a second sprocket 21 which serves to drive conveyer parts, as more particularly referred to hereinafter.

The corn harvester is shown as comprising two similar picker units 23, 23ª, each including picking and husking elements or sections disposed at its own side of the tractor frame laterally within the adjacent traction wheel 6, and a conveyer 24 disposed laterally inside each corn picker unit and passing beneath the rear axle of the tractor, for conveying husked corn rearwardly from the picker units for deposit on the lower end of an elevating conveyer 25 which serves to convey the husked corn to a trailing wagon, the elevating conveyer 25, the husked corn conveyers 24 and the picker units 23, 23ª being each separately detachable from the tractor.

Each picker unit includes a pair of laterally spaced longitudinally extending frame bars 27, 27ª, which may be in the form of angle bars and connected together at their rear ends by a light crossbar 28. A section of shaft 29 is rotatably mounted in bearings 30 mounted on the frame bars 27, 27ª near the rear end thereof, with the ends of such shaft extending laterally beyond the frame bars. The forward portion of the frame bars 27, 27ª are held in desired spaced relation through a tie rod 31 between and having its end portions adjustably connected to hanger bars 32, preferably of spring steel, rigidly secured at their upper ends by bolting to a flange of each of the frame bars 27, 27ª. The ends of the tie rod 31 are threaded and pass through openings in the hangers 32, with nuts 34, 35 on the threaded ends of the tie rod adjustable to draw the resilient hanger bars 32 toward each other to the desired extent and hold them securely spaced from one another in braced and tied relation. A second tie rod 36 passing through apertures in the hangers 32, adjacent the lower end thereof, and similarly secured to such hangers by nuts 34, 35, serves to assist in bracing and securing the hanger bars and frame bars 27 in position with respect to each other. The resilient hanger bars 32, in conjunction with the tie rods 31, 36, and the securing nuts 34, 35 suitably positioned on the tie rods, act as a resilient supporting and bracing arch for the forward portions of the frame bars 27, 27ª and parts carried thereby of the picker unit.

A pair of cooperative picking and husking rolls 38, 39 are mounted on the supporting bars of the picker frame. These rolls 38, 39 are hollow and are mounted and keyed on outer and inner rotatable shafts 40, 40ª, respectively. The roll 38 is in three sections, a screw conveyer picker section 41 tapering to a reduced forward end, an intermediate screw conveyer husking section 42 of substantially uniform diameter, and a rear trash clearing section 43 provided with peripheral longitudinal grooves. The inner roll 39 has a forward screw conveyer picker section 45, generally similar to the section 42 of the roll 38, but with its threaded surface of opposite pitch, an intermediate section 46, of cast metal, of substantially uniform diameter and preferably covered with resilient rubber, and a rear trash clearing section 43 of the same form as the corresponding section of the roll 38. Rearwardly of the section 43 of each roll, there is mounted on the roll shaft a gear section 48, 48ª, these gears being in meshed driving relation.

The rear end portion of the roll shafts 40, 40ª are rotatably mounted in bearings carried by a split bearing bracket or housing mounted on the side bars 27, 27ª and comprising a lower section 50 and an upper section 51. The bearing bracket is held in position through side flanges on its sections 50, 51 which are secured by bolts passing through such flanges and the transverse flanges of the side bars 27, 27ª, preferably with the flanges of the section 50 below and the flanges of the section 51 above the flange of such side bars. Bearing sleeves 52 and 53, preferably provided with flanges at their axial ends, for cooperation with the ends of the bearing housing, to restrain axial movement of the sleeves, are mounted in position within the bearing housing 50, 51. This bearing bracket serves as an additional tie between the rear end portion of the side bars 27, 27ª. These bearing sleeves may be provided with peripheral projections 54 passing into slots 56 in the upper bearing section 51 and cooperating with the side walls of such slots to prevent rotation of the sleeves.

Means for permitting a desired yieldable lateral adjustment of the bearing sleeve 53 relative to the bearing sleeve 52 is provided, such means including a compression spring 57 yieldingly pressing against a lateral abutment on the sleeve and an abutment 58, the limit of whose position and the normal compression of the spring are determined by an adjustable screw 58ª, passing through the inner side wall of the bearing bracket 51 and suitably locked in adjusted position therein. This device for permitting yielding movement of the bearing sleeve 53 is of utility in providing for and permitting such lateral displacement of the roll 39 relative to the roll 38 as may be necessary at times in order to permit passage downwardly through the rolls of some relatively unyielding material that comes between the rolls. The rolls are driven in opposite directions through cooperative meshing beveled gears 59 and 60 on the shaft 29 and the rear end of the shaft 40 of the roll 38, respectively, the meshed gears 48, 48ª on the rolls serving to rotate the roll 39.

The forward ends of the shafts 40, 40ª of the combined picking and husking rolls 38, 39, are rotatably mounted in bearings carried by brackets 61, 61ª fixedly secured to the forward portion of the side bars 27, 27ª, respectively, and extending inwardly therefrom, the forward side of these bearing brackets tapering inwardly toward the rear end and thus assisting in guiding corn stalks toward the space between the forward ends of the picker rolls.

Each corn picker unit is provided with two sets of chains or conveyers having lugs or projections which engage and cooperate with the standing corn stalks as the tractor progresses through the corn field to be harvested. Lower stalk conveying chain 63, 63ª and upper conveying chains 64, 64ª are carried by the frame bars 27, 27ª of the picker unit in desired operative relationship with the picking rolls thereof. The lower and upper conveying chains are driven by sprockets 65, 67, respectively, rotatably mounted on shafts 68, 68ª on the frame bars 27, 27ª, respectively, these shafts each being rotatably supported in a pedestal bearing 69, secured in position on the upper side of each of the frame bars. As indicated, the shaft 68ª and its support, mounted on the inner frame bar 27ª, are located at a position somewhat forward of the position of the corresponding parts on the outer frame bar 27. A guide bearing 70, intermediate the sprockets 65, 67, is provided for each of the shafts 68, 68ª. This guide bearing is mounted on a plate or bar 71, 71ª, extending in the same general direction as the frame bar and supported thereon and in three sections offset from one another. The bars 71 are mounted at the rear end on a forwardly extending projection on the pedestal 69. The lower chain 63, 63ª travels over a sprocket 72 rotatably mounted on a stub shaft or bolt 73 secured in the forward portion of the bearing bracket 61, 61ª, respectively. The shaft 73 preferably passes upwardly through the forward portion of the bar 71, and may be secured in position relative thereto by a nut or head on the shaft 73 engaging with the bar.

The extreme forward portion of the bars 71, 71ª tapers outwardly, the taper on the outer bar 71 being indicated as somewhat greater than on the inner bar 71ª. Sprockets 75 are rotatably supported at the underneath side of the forward end of the bars 71, 71ª on a stub shaft or bolt secured to each bar; and these sprockets act as front guiding sprockets for the upper gathering chains 64, 64ª.

An idler sprocket 76 is shown for confining the rear portion of the path of travel of the inner course of the upper chain 64, so that it may be in substantially vertical alinement with the corresponding portion of the lower chain 63. This sprocket 76 is rotatably mounted on a stub shaft or bolt secured to and suspended from an arm 78 attached to and projecting rearwardly from the upper forward portion of the bar 71, the attachment of this supporting arm preferably permitting adjustment of the position of the idler sprocket 76; or the supporting stub shaft for the sprocket 76 may be secured in adjustable position on an intermediate portion of the bar 71 at the upper side thereof.

The shafts 68, 68ª, carrying sprockets 65, 67 thereon, are driven by V-belts 81, 82, respectively, cooperating with V-groove sheaves 83, 83ª, respectively, on the shafts 68, 68ª, respectively. The driving belts 81, 82 cooperate with driving sheaves 84, 85, respectively, mounted on a countershaft 86 rotatably supported in bearings carried by pedestals detachably mounted on, or forming an integral extension of, bearing pedestals 30 which are mounted on the rear end portions of the frame bar 27, 27ª.

The shaft 86 is driven from the shaft 29, preferably by a chain drive from sprocket 87 on shaft 29 to sprocket 89 on shaft 86.

Pairs of sprockets 91, 92 are rotatably mounted in spaced relation on the tie rods 31, 36, respectively, between the hanger bars 32 which latter are mounted in and secure forward portions of the frame bars 27, 27ª in the desired spaced relation. A second set of hanger bars 93 is secured to the side bars 27, 27ª of the picker unit at a point rearwardly of the hangers 32. A shaft 94 is rotatable in bearings mounted in openings in the hangers 93, and the shaft has sprockets 95 secured thereon in the same spaced relation as the sprockets 91 and 92 on the shafts 31 and 36, respectively, and a driving sheave 96 is mounted on the shaft 94 at the outer side of the picker unit.

A traveling conveyer structure 97 is disposed beneath the husking rolls of each picker unit, this conveyer comprising parallel side chains 98 which run over sprockets 91, 92, on rods 31 and 36, respectively, and sprockets 95 on shaft 94, and cross bars on blades 101, secured at their ends to the links of the side chains 98. The sheave 96 is driven by a V-belt 102 which in turn is driven by a sheave 103 mounted on the outer end of the shaft 86. The conveyer 97 is driven in such direction that the upper course of the conveyer moves forwardly and the front course hence moves downwardly, and in so doing, it engages the standing stalks and bends the same forwardly and downwardly as the machine moves forward, so that all parts of each stalk pass through the rolls at the forward portion thereof, and hence there is little in the matter of leaves and trash to clutter the husking rolls.

The outer end of the shaft section 29 on the picker frame is rotatably mounted in a bearing sleeve 104 provided with a projecting arm or web 105 detachably mounted on the rear axle housing 7, to thereby secure the bearing sleeve 104 in position as an outboard supporting bearing for the shaft 29 when the picker unit is mounted on the tractor frame.

It will be apparent from the above description that each picker unit is a complete assembly in itself, including a supporting frame carrying a pair of combined picking and husking rolls, gathering chains and a stalk bending conveyer, along with the necessary mechanical drives for applying the required power to the rolls, gathering chains and conveyer. The picker units are detachably mounted on the tractor frame by connecting the inner end of each shaft section 29 to an outwardly projecting end of the cross shaft 19 mounted on the tractor frame, this connection being made through a shaft coupling 106, separable from one or both of the shafts 19 and 29, and the attachment of supporting web 105 of the bearing 104 in position on the tractor rear axle housing.

The forward end of the picker units may be connected by a cross bar 107, which is detachably connectable to the inner frame bar 27ª of the picker units, beneath the tractor frame. An arm of a bell crank lever 108, pivoted on the tractor frame, is detachably connectable to the cross bar 107 through one or more tension springs 109, the lower end of which may be adjustably connected to the cross bar 107 to vary the normal tension of the springs. The other arm of the bell crank lever 108 is connected, through a rod 110, to an adjusting hand lever 112 pivotally mounted on the tractor frame. With the hand lever 112 in any adjusted position, and held therein by a conventional form of latch on the hand lever engaging in a notch on a fixed quadrant 113, the picker units are resiliently supported, through the spring connection 109, at a desired level above the ground; or the picker units may be raised higher to permit travel of the tractor, with the picker units mounted thereon, for ordinary transport purposes.

The conveyers 24 each comprises a housing 121 containing a traveling chain conveyer 123 having spaced flights. The housing 121 is mounted through a hanger 124 adjacent the forward end of the housing, this hanger 124 being attached to the inner wall of the housing and detachably mounted on the adjacent side bar 3 of the tractor frame; and the conveyer housing extends beneath the rear axle housing of the tractor to a point rearwardly thereof. The rear end of each conveyer housing may be supported on a bracket 126, and the bottom or the outer side wall of the housing may be detachably secured to such bracket; and the bracket may be detachably secured, through a flange thereon, to the vertical flange of the adjacent supporting angle bar 127 which is secured, preferably in a detachable manner, to the outer face of the vertical flange of one of the spaced angle bars 128 rigidly supported at the forward end on the tractor frame or the rear axle housing, the spaced angle bars 128 constituting a conventional form of support for an operator's platform 129 on the tractor. The rear portion of the housing 121 is restrained against appreciable lateral movement through engagement with an outer lip or flange on the bracket 126 and with the inner lateral flange on the forwardly projecting portion of the angle bar 127. The rear portion of the conveyer housing may be further supported by one or more hangers detachably connected to the rear portion of the side bars 3 of the tractor frame or to the rear axle housing.

Mounted in bearings 131 secured to the side walls of the conveyer housings 121, adjacent the rear end thereof, are shafts 132, 132ª, the inner ends of each such shaft projecting substantially beyond the inner wall of the conveyer housing in which it is mounted; and each shaft is provided, at an intermediate portion within the conveyer housing, with a driving sprocket 133 for the chain conveyer 123. The shaft 132ª has, on the inwardly extending portion thereof, a driving sprocket 134. The inwardly projecting ends of the alined shafts 132, 132ª are detachably connected through a torque tube 135.

Adjacent the forward end of each conveyer 24 is a shaft 137 mounted in bearings, similar to bearings 131 at the rear of the conveyer housing, and a sprocket 138 is mounted on such shaft intermediate the side walls of the conveyer housing. The flighted conveyer chain 123 is of a conventional type, the upper course of the conveyer moving rearwardly during normal operation of the conveyer; and this upper course of the chain conveyer runs over a partition or wall 140 extending between the side walls of the conveyer housing, such partition extending substantially the full distance between the conveyer sprockets 133, 138. The sprocket 134 is driven, through a chain or like connection, from a sprocket 141 on shaft 142 mounted in bearings 143, preferably detachably mounted on the angle supports 127. This shaft 142 is provided with a drive sprocket 145, preferably connected to the shaft through a conventional ratchet type of load limiting clutch; and the sprocket 145 is driven by the sprocket 21 on the shaft 13 associated with the tractor power takeoff.

On the inner frame bar 27ª of each corn picker unit, a guide or deflecting plate 151 is mounted along the inner side of the husking portion of the roll 39, this deflecting plate having an inclined upper portion whose upper edge is adjacent the roll 39 and an inclined lower portion which extends to a point where it will lie adjacent or overlap the upper edge of the outer wall of the housing 121 of the conveyer 24, this deflecting plate 151 serving to guide husked corn from the inner husking roll to the conveyer.

A collecting pan 156 for any shelled corn that may drop through husking portions of the rolls 38, 39 and thence through the upper course of the bending conveyer 97, is provided. This collecting pan is disposed beneath the upper course of the bending conveyer 97, and may be held in operative position by providing a flange 157 on the forward side of the pan, this flange being connected to a flange or angle support 158 secured to the inner hanger bar 32 of the support for the bending conveyer. The bottom of the pan 156 is inclined inwardly and terminates in a discharge lip, as indicated at 159, which cooperates with an aperture 160 in the outer wall of the housing 121 of the husked corn conveyer, so that any shelled corn dropping on the collecting pan 156 will pass over the discharge lip 159 and onto the conveyer 24.

The collecting pan 156, instead of being mounted on the spring steel arch hangers 32 of the corn picker frame, may be permanently or detachably mounted on the outer wall of the conveyer housing 12, as through flanges on the inner edge of the collecting pan secured to the outer side wall of the conveyer housing about the opening 160 therein.

The housings of the husked corn conveyers 24 are provided at their rear ends with inwardly turned end open discharge portions 165, either formed integral with or rigidly united to the housings, or formed separate from such housings and detachably connected thereto. These discharge end portions fit over and preferably into the rear end or well portion of the housing 167 of an elevating conveyer 25 whose upper rear end is provided with a depending discharge chute 169, as shown in Fig. 12, in position to discharge the conveyed material into the box of a wagon drawn by the tractor. The conveying element 171 is of the chain type, with bar shaped flights attached at spaced points to a centrally located chain; and the chain is driven by a sprocket 172 within the forward well portion of the conveyer housing and mounted on a shaft 173 rotatably supported in bearings fixed to the side walls of the housing, with the shaft ends extending considerably beyond the bearings. On the right hand extending end of this shaft, a driving sprocket 174 is mounted, this sprocket preferably being connected to the shaft, as indicated in Fig. 2, through a conventional form of overload release clutch. The upper course of the flighted conveyer chain preferably operates over a plate 175 secured to the side walls of the conveyer housing 167.

The elevating conveyer housing 167 is mounted in operative position with its lower rear well portion disposed between the spaced angle bar supports 127, with the end extensions of the shaft 173 disposed within bearings 176, open at the rear side, and each detachably secured to the lateral flange of the supporting angle bars 127. These bearings 176, preferably in conjunction with a cross bar 178 detachably connected to the rear end of the angle bar supports 127, serve to carry the weight of this conveyer housing; and the latter is maintained in desired position of elevation by bars or tie rods 179 pivotally connected to the opposite ends of the rear axle housing of the tractor. These rods 179 are inclined toward each other and are connected through a pin to a chain 181 of adjustable length and attached at a suitable point to the walls of the conveyer housing 167, about midway of its length. Through adjustment of the length of chain 181, the inclination of the conveyer 24 may be suitably varied.

The driving sprocket 174 on the shaft 173 is driven through a chain from a driving sprocket 183 on the shaft 142.

A housing or guard 185 is preferably provided for the torque shaft 135 at the rear of the operator's platform, this guard being suitably detachably mounted in position and having a rear edge portion 186 projecting downwardly and cooperating with the discharge end portions of the conveyer housings 121 to insure discharge of material from such conveyers into the well of the elevating conveyer 25.

Figure 13:
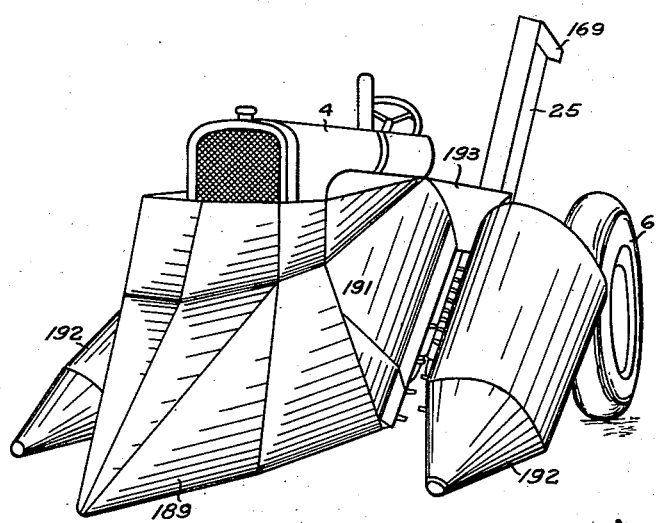
Fig. 13 is an overall perspective view of the corn picker assembled on the tractor, showing a divider and gathering shields mounted in position.

The forward portions of the tractor and picker units are provided with suitably removable divider and gathering shields, including, as indicated in Fig. 13, a central divider element 189 provided with a divider point and shielding the front caster wheels and the front portion of the tractor and detachably mounted on the tractor frame or body, and rearward extensions 191, preferably separable from the divider point, and detachably mounted on the tractor frame or body so as to substantially cover the inner sides of the picker units and operating parts thereof and shielding the engine parts of the tractor. Separate side gathering shields 192, provided with forward gathering points, are detachably mounted on the outer frame bars 27 of the picker units and serve to shield the outer half of the picker units and the operating parts thereof. The rear ends of the side shields 192 and the extensions 191 of the inner shield are detachably joined and braced through a removable transverse guard 193, whose normal position is substantially over the rear end part of the husking portion of the rolls 38, 39.

With the corn picker units and the conveyer attachments therefor mounted on the tractor as hereinabove described and the picker units adjusted, through the controlling hand lever 112, to proper position above the ground and the gathering chains of the picker units operating at a speed which is preferably substantially synchronous with respect to the forward travel of the tractor, then as the tractor-mounted picker travels through a corn field, the cooperating rolls of each picker unit are in general alinement with the standing rows of corn stalks. Through the cooperative action of the central divider 189 and the gathering points of the side shields 192, leaning and broken stalks are straightened, and the gathering chains 64, 64ª, and thereafter the gathering chains 63, 63ª, serve to guide and feed the stalks into cooperative relation with the snapping points 41, 45 of the picking and husking rolls 38, 39, respectively. As the machine progresses, the stalks pass between the rolls, and the ears of corn are snapped from the stalks through action of the oppositely rotating and oppositely threaded snapping portions 41, 45 of the rolls. The snapped ears travel upwardly along the oppositely rotating rolls, assisted by the conveying action of the screw projections on the intermediate or husking portions of the roll 38; and through the cooperative action of this portion 42 of the roll 38 and the smooth rubber covered husking portion 46 of the roll 39, the latter rotating at somewhat higher speed than the roll 38, the husks are drawn from the ears by being gripped or pinched between the rolls and drawn downwardly therethrough. The husked ears then fall inwardly over the inner roll 39 and, guided by the plate 151, drop into the conveyer 24 and are carried rearwardly and discharged thereby into the forward well of the elevating conveyer 25 and are elevated thereby and discharged to a wagon or other receptacle.

As the machine progresses, the stalks, from which the ears are snapped by the snapping points 41, 45 of the picker rolls, contact with the downwardly traveling forward portion of the bending conveyer 97. Through this engagement of the stalks with the bending conveyer, the relatively rearward travel of the stalks is impeded; and as the machine and the bending conveyer advances, the stalks are bent forwardly and the full length thereof thus passes between the cooperative rolls without reaching a point thereon where they would materially impede the desired husking action of the rolls or clutter the same with leaves or stalk fragments; and there is little likelihood of the latter being carried over to the conveyers 24 with the husked ears, and clogging of the drives of the picker units. Any leaves, husks or stalk fragments which do not pass downwardly through the husking portion of the rolls are readily evacuated downwardly between the rolls by the action of the rear clearing portions 43 of the rolls.

Through the action of the bending conveyer 97 in engaging the cornstalks and forcibly acting on the same to draw them forwardly and downwardly through the forward portion of the rolls 38, 39, thus relieving the body and rear portions of the rolls of stalk leaves and fragments, efficient snapping and husking action may be secured through combined snapping and husking rolls of minimum length and weight and with minimum trash passing along to the conveyers with the husked ears, and also with minimum liability of clogging of the picker parts and drives with trash. As the lower portion of the bending conveyer 97 rolls over the stalks after the latter have passed through the picker rolls and are in partly flattened condition, the bending conveyer may exercise an appreciable wearing away or shredding action on the stalks, the results of which are beneficial in facilitating later plowing under of the stalks.

Shelled corn removed from the ears during the husking operation passes through the husking portions of the rolls and through the spaces between the linked flights of the upper course of the bending conveyer 97 and onto the collecting pan 156 from which it discharges to the conveyer 24; and the flights thereof, moving along the plate 140 of the conveyer, insure carrying the shelled corn, along with the husked ears, to the elevating conveyer 25.

A clutch operable from the operator's position may be provided in the power takeoff which will permit operation of the tractor without operating the corn picker units and their conveyer attachments.

The corn picker units and conveying attachments therefor may be readily removed from the tractor, as well as assembled thereon. To dismount the rear elevating conveyer 25, it is necessary only to remove the drive chain from the sprocket 174 on the shaft 173, and release the connection of the chain 181 from such conveyer or the rearwardly extending supporting bars 179; and after removing the detachable cross-bar 178, the rear end of the conveyer may be dropped, and the conveyer drawn rearwardly to remove the conveyer shaft 173 from its supporting bearings 176 carried by the supporting angle bars 127. The supporting bars or rods 179 may then be removed from their attachment to the rear axle housing of the tractor.

The guard 185 over the torque tube connection 135 may be removed from its attachment at the rear end portions of the housings of the conveyers 24 adjacent the operator's platform 129. And the central divider 189, with its extensions 191, and the side gathering shields 192 removed from the tractor and picker units, the conveyers 24 and picker units may be readily removed from the tractor.

To detach the picker units from the tractor, it is necessary only to drop the front portion of the picker units to the ground or suitable temporary support, and detach the spring 109 from the bell crank lever 108, disconnect the cross bar 107 from the inner frame bars 27ᵃ of one of the picker units, detach the outboard bearings 104 from the rear axle housing, and disconnect the shaft 29 of each picker unit from the shaft 19 at the couplings 106. The rear end of each picker unit may then be moved or lowered to the ground or a suitable support; and with the picker units thus supported independently of the tractor, the tractor may then be driven backward past the lowered picker units.

In order to dismount each of the husked corn conveyers 24 from the tractor, after the picker units are dismounted, it is necessary only to remove the detachable torque tube 135 which connects the rear sprocket shafts 132, 132ᵃ of these conveyers, remove the driving chain from the sprocket 134 on shaft 132ᵃ, disconnect the hanger plate 124 from the side bar 3 of the tractor frame and disconnect the supporting brackets 126 from the supporting channel 128, or detach the housing from such bracket. The conveyers can then be lowered to the ground and drawn out forwardly or rearwardly beneath the rear axle housing, or the tractor may be moved past the lowered conveyers.

With the parts thus removed from the tractor, the latter may be operated for its usual purposes, with the angle supports 127 and the shaft 142 carried thereby and the shaft 19, and the drives for these shafts in position, or these latter parts may be detached from the tractor.

The reassembly of the corn picker units and the conveyers and their drives on the tractor can be readily accomplished in a manner which will be apparent from the description hereinabove.

It should be understood that the invention is not limited to the exact details of design and construction described herein, for obvious modifications within the scope of the appended claims will be apparent to persons skilled in the art.

It is claimed and desired to secure by Letters Patent:

1. In combination, a frame carrying a supporting axle structure on which a pair of laterally spaced wheels are mounted, a corn harvester mounted on said frame and comprising forwardly extending cooperative picking and husking rolls disposed wholly forwardly of the axis of said wheels, and a conveyer for receiving and conveying rearwardly husked ears of corn after passage thereof from said husking rolls, said conveyer extending rearwardly between said wheels and beneath said axle structure.

2. In combination, a frame carrying a supporting axle structure on which a pair of laterally spaced wheels are mounted, a corn harvester mounted on said frame and comprising forwardly extending cooperative picking and husking rolls disposed wholly forwardly of the axis of said wheels, and a conveyer for receiving and conveying rearwardly husked ears of corn after passage thereof from said husking rolls, said conveyer being disposed laterlly inside said rolls and extending rearwardly between said wheels and beneath said axle structure.

3. In combination, a frame carrying a supporting axle structure on which a pair of laterally spaced wheels are mounted, a corn harvester mounted on said frame and comprising two laterally spaced pairs of cooperative, forwardly extending rolls disposed forwardly of the axis of said wheels and having picker portions adjacent their forward end and husking sections rearwardly of said picker portions, and a pair of rearwardly extending conveyers for receiving and conveying rearwardly ears of corn after passage thereof from said pairs of husking roll sections, each of said conveyers receiving and conveying husked corn passed from one of said pairs of husking roll sections and extending rearwardly between said wheels and beneath said axle structure.

4. In combination, a wheel-supported frame, and a corn harvester attachment comprising a pair of laterally spaced forwardly extending arms pivotally mounted on said frame for movement in a vertical plane, cooperative harvesting rolls mounted on said arms, and a resiliently yielding bracing arch between said arms and disposed beneath said arms.

5. In combination, a wheel-supported frame, and a corn harvester attachment comprising a pair of laterally spaced forwardly extending arms pivotally mounted on said frame for movement in a vertical plane, cooperative corn harvesting rolls mounted on and extending longitudinally of said arms, and a yielding bracing arch between said arms forwardly of the pivotal point thereof and comprising a resilient bracket secured to and extending downwardly from each of said arms, and a tie rod connected to said brackets beneath said arms for holding said arms in desired spaced and yieldingly braced relation.

6. In combination, a wheel-supported frame, and a corn harvester attachment comprising a pair of laterally spaced forwardly extending arms pivotally mounted on said frame for movement in a vertical plane, cooperative combined picking and husking rolls mounted on and extending longitudinally of said arms, and a yielding bracing arch between said arms forwardly of the pivotal point thereof and comprising a resilient bracket secured to and extending downwardly from each of said arms, and a tie rod adjustably connected to said brackets beneath said arms for holding said arms in desired spaced and resiliently yielding braced relation.

7. In combination, a wheel-supported frame, and a corn harvester attachment comprising a second frame mounted on said first frame, a pair of forwardly extending cooperative corn harvesting rolls mounted on said second frame, and stalk bending means carried by said second frame and disposed beneath said rolls and operative to engage standing stalks between said rolls and bend said stalks forwardly as said wheel-supported frame advances.

8. In combination, a wheel-supported frame, and a corn harvester attachment mounted on said frame and comprising a second frame pivotally mounted on said first frame at one side thereof for movement in a vertical plane, a pair of forwardly extending cooperating corn picking rolls mounted on said second frame, and stalk bending means carried by and disposed beneath said pivoted frame and said rolls, said bending means comprising a movable element operative to engage standing stalks between said rolls and bend said stalks forwardly as said wheel-supported frame advances.

9. In combination, a wheel-supported frame, and a corn harvester attachment mounted on said frame at one side thereof and comprising a second frame pivoted adjacent its rear end on said first frame for movement in a vertical plane, a pair of forwardly extending cooperative corn picking and husking rolls mounted on said second frame, and stalk bending means carried by said pivoted frame and disposed beneath said rolls, said bending means comprising an endless traveling flexible element whose forward portion travels downwardly and is operative to engage standing stalks between said rolls and bend said stalks forwardly as said wheel-supported frame advances.

10. In combination, a wheel-supported frame, and a corn harvester attachment comprising a pair of laterally spaced forwardly extending arms pivotally mounted on said frame for movement in a vertical plane, cooperative corn picker rolls mounted on and extending longitudinally of said arms, a yielding bracing arch between and depending from said arms forwardly of the pivotal mounting of said arms on said frame for maintaining said arms and the rolls carried thereby in desired operative relation, and stalk bending means supported by said arch beneath said pivoted arms and said rolls carried thereby, said bending means being engageable with standing corn stalks between said rolls to bend said stalks forwardly as said wheel-supported frame advances.

11. In combination, a wheel-supported frame, and a corn harvester attachment comprising a pair of laterally spaced forwardly extending arms pivotally mounted on said frame for movement in a vertical plane, cooperative combined picking and husking rolls mounted on and extending longitudinally of said arms, a yielding bracing arch between and depending from said arms forwardly of the pivotal mounting of said arms on said frame for maintaining said arms and the rolls carried thereby in desired operative relation, and stalk bending means beneath said pivoted arms and said rolls carried thereby and supported by said arch, said bending means comprising a movable element traveling downwardly at its forward side, and said forward side being engageable with standing corn stalks between said rolls to bend said stalks forwardly as said wheel-supported frame advances.

12. In combination, a wheel-supported frame, and a corn harvester attachment mounted on said frame and comprising a second frame pivotally mounted on said first frame and including a pair of forwardly extending spaced arms, a pair of forwardly extending cooperative picker rolls mounted on said arms, a bracing arch disposed beneath said pivoted frame for holding the forward portions of said arms and the rolls carried thereby in desired spaced relation, said arch comprising a resilient bracket secured to and depending from each of said pivotally mounted frame bars, a tie rod adjustably connecting and bracing said frame bars and serving to hold the latter in desired adjustable spaced relation, stalk bending means carried by said arch beneath said rolls, said bending means comprising a traveling flexible element whose forward portion travels downwardly and engages standing stalks between said rolls as said wheel-supported frame advances, a rotatable support for said flexible traveling element and carried by said tie rod, a second and rearwardly disposed pair of depending arms secured to said frame bars, and a rotatable driving sprocket supported in position by said second pair of depending arms and serving to drive said flexible traveling element.

13. In combination, a wheel-supported frame, and a corn harvester comprising a frame pivotally mounted on said first frame and including a pair of laterally spaced forwardly extending arms, harvesting rolls comprising cooperative husking roll sections mounted on said arms, a yielding bracing arch between said arms and disposed beneath the same forwardly of the pivotal point of said second frame, a conveyer for receiving and conveying rearwardly husked ears of corn after passage thereof from said husking roll sections, and a receiving device disposed below said husking roll sections and supported by said bracing arch in position to receive shelled corn passing through said husking roll sections and discharging said shelled corn to said conveyer.

14. In combination, a wheel-supported frame, and a corn harvester mounted on said frame and comprising a pair of laterally spaced forwardly extending arms pivotally mounted on said frame for up and down movement of the forward end of said arms, a pair of cooperative husking rolls mounted on said arms, a yielding bracing arch between and depending from said arms forwardly of the pivotal point thereof, a conveyer disposed alongside said rolls for receiving and conveying rearwardly husked ears of corn after passage thereof from said rolls, and a receiving device disposed below said rolls in position to receive shelled corn passing through said rolls, said receiving device being supported on said bracing arch and having a laterally directed discharge for discharging shelled corn on to said conveyer.

15. In combination, a frame carrying an axle support for a pair of laterally spaced wheels on which said frame is mounted, and a corn harvester mounted on said frame and comprising a pair of laterally spaced forwardly extending arms pivotally mounted on said frame for up and down movement of the forward end of said arms, cooperative harvesting rolls mounted on said arms and including forward picking portions and rearward husking portions, a bracing arch between said arms and disposed beneath said arms and said rolls carried thereby, a conveyer for receiving and conveying rearwardly ears of corn after passage thereof from the husking portions of said rolls, stalk bending means carried by said bracing arch and comprising an open-work endless traveling element having a forwardly traveling upper portion and a downwardly traveling forward portion, the latter portion being operative to engage standing stalks between said rolls and bend said stalks forwardly and downwardly, and a device disposed below said rolls and the upper portion of said traveling bending element and in position to receive shelled corn passing through the husking portion of said rolls and said upper portion of said traveling element and having a discharge portion for discharging the shelled corn to said conveyer.

16. In combination, a tractor comprising a frame carrying a power unit and having an axle support for a pair of laterally spaced traction wheels, and a corn harvester detachably mounted on said tractor and comprising cooperative picking and husking rolls disposed forwardly of the axis of said traction wheels, and a conveyer in position to receive husked ears of corn after passage thereof from said rolls and extending rearwardly beyond said rolls and between said wheels and beneath said axle support.

17. In combination, a tractor comprising a frame carrying a power unit and having a front wheeled support and a rear axle support for a pair of laterally spaced traction wheels, and a corn harvester detachably mounted on said tractor and comprising cooperative harvesting rolls, and a conveyer in position to receive ears of corn after passage thereof from said rolls, said conveyer extending rearwardly beyond said rolls between said traction wheels and beneath said rear axle support.

18. In combination, a tractor comprising a frame carrying a power unit and having a front wheeled support and a rear axle support for a pair of laterally spaced traction wheels, and a corn harvester detachably mounted on said tractor and comprising forwardly extending harvesting rolls disposed forwardly of the axis of said wheels and comprising cooperative picking sections, and husking sections alined with said picking sections, and a conveyer extending rearwardly beyond said husking roll sections and between said traction wheels and beneath said rear axle support, said conveyer being in position to receive husked ears of corn after passage thereof from said husking roll sections, a power takeoff connection from said power unit operating at a speed proportional to the speed of travel of the tractor, and actuating mechanism driven by said power takeoff for operating said harvesting rolls and said conveyer.

19. In combination, a tractor comprising a frame carrying a power unit and having a front wheeled support and a rear axle support for a pair of laterally spaced traction wheels, and a corn harvester detachably mounted on said tractor and comprising cooperative picking and husking roll sections disposed at each side of the tractor frame in advance of said rear axle support, a conveyer associated with the husking roll sections at each side of the tractor and positioned to receive ears of corn after passage thereof from the adjacent husking roll sections, said conveyers extending rearwardly beneath said rear axle support, and actuating mechanism driven by said power unit for operating said picking and husking roll sections and said conveyers.

20. In combination, a tractor having a relatively narrow and substantially centrally located body, and a rear axle support for a pair of laterally spaced traction wheels, and a corn harvester attachment detachably mounted on said tractor and comprising a support pivotally mounted on said tractor and carrying a pair of forwardly extending cooperative harvesting rolls including axially alined picking and husking sections disposed alongside the body of said tractor in advance of the axis and within the tread of said traction wheels, and a conveyer having its forward portion below and laterally inside the husking sections of said rolls and extending rearwardly beneath said rear axle support.

21. In combination, a tractor having a relatively narrow and substantially centrally located body, a front wheel support, and a rear axle support carrying a pair of laterally spaced traction wheels, and a corn harvester attachment detachably mounted on said tractor and comprising a pair of forwardly extending cooperative combined picking and husking rolls pivotally mounted on said tractor at each side of the body thereof and laterally outside of said front wheeled support and forwardly of the axis and inside the tread of said rear traction wheels, and a conveyer at each side of the tractor and extending rearwardly beneath the rear axle support and between said rear traction wheels of said tractor, each of said conveyers being operative to receive husked ears of corn after passage thereof from the adjacent pair of said husking roll sections and convey said ears rearwardly.

22. In combination, a tractor having a relatively narrow and substantially centrally located body, a front wheel support, and a pair of laterally spaced traction wheels carried by an axle support at the rear end of said body, and a corn harvester attachment comprising a frame at each side of the body of said tractor and pivotally mounted thereon and disposed laterally outside of the track of said front wheeled support and laterally inside the track of the adjacent rear wheel of the tractor, a pair of cooperative combined picking and husking rolls carried by each of said pivoted frames, and a conveyer extending rearwardly from each pair of said rolls and beneath the rear axle support of said tractor, each of said conveyers being disposed laterally inside and beneath the adjacent portion of the corresponding pair of rolls and operative to receive ears of corn after passage thereof from the adjacent pair of said rolls and convey said ears rearwardly.

23. In combination with a tractor having a rear axle support with a pair of laterally spaced traction wheels mounted thereon, a body extending forwardly from said axle support intermediate said traction wheels, a front wheeled support for said body, and corn harvesting mechanism supported by said tractor and comprising a frame pivoted on said tractor at one side of the body portion thereof laterally within the tread of said rear traction wheels, a pair of laterally spaced and substantially parallel, forwardly extending shafts rotatably mounted on said pivoted frame, longitudinally alined picker and husker roll elements mounted on each of said shafts, and a conveyer having its forward portion below said husking roll elements and in position to receive husked ears discharged from said husking rolls, said conveyer extending rearwardly beneath said rear axle support and between said rear traction wheels.

24. In combination, a tractor carrying an engine and having an axle support for a pair of laterally spaced traction wheels, means for transmitting power from said engine to said traction wheels, a corn harvester attachment detachably mounted on said tractor, said corn harvester attachment including a forwardly extending frame detachably and pivotally mounted on said tractor, a pair of combined picking and husking rolls rotatably mounted on said frame, gathering mechanism carried by said pivoted frame, a conveyer extending rearwardly from said rolls beneath said axle support and between said traction wheels and adapted to receive ears of corn after passage thereof from the husking portion of said rolls, and driving connections from said power transmitting means to said rolls, gathering mechanism and conveyer for insuring operation of said parts at a speed constantly proportionate to the speed at which said traction wheels are driven by said power transmitting means.

25. In combination, a tractor carrying an engine and having an axle support for a pair of laterally spaced traction wheels, a wheeled support for the front end of said tractor, means for transmitting power from said engine to said traction wheels, a transverse shaft mounted in bearings carried by said tractor frame, a power takeoff from said power transmission means for supplying power to said shaft, a detachable corn harvester attachment mounted on said tractor and including a frame pivotally mounted on a detachable end extension of said transverse shaft, and a pair of cooperative harvester rolls rotatably mounted on said frame, and a driving connection from said transverse shaft to said harvester rolls for operating the latter.

26. In combination, a tractor comprising a longitudinally extending body carrying an engine and supported at its rear end by a pair of laterally spaced traction wheels mounted on a rear axle support carried by said body, and a wheeled support for the front end of said body, means for transmitting power from said engine to said traction wheels, a transverse shaft mounted in bearings carried by the body of said tractor forwardly of the axis of said traction wheels, a power takeoff from said power transmission means for supplying power to said shaft, a detachable corn harvester attachment including a frame, a transverse shaft rotatably mounted in bearings carried by a rear portion of said frame, means for detachably connecting said latter shaft to an end portion of said first transverse shaft, a pair of cooperative harvester rolls rotatably mounted on said frame, a driving connection between the transverse shaft carried by said frame and said harvester rolls carried thereby, and a removable outboard bearing for the outer end of the shaft carried by said frame, said bearing being mounted on said tractor.

27. In combination, a tractor having an engine, a rear axle support for a pair of laterally spaced traction wheels, a body extending forwardly from said axle support intermediate said traction wheels, and a front wheeled support for said body, corn harvesting mechanism detachably mounted on said tractor and comprising a frame pivoted on said tractor at each side of the body thereof and laterally within the tread of said rear traction wheels, a pair of laterally spaced and substantially parallel, forwardly extending shafts rotatably mounted on each of said pivoted frames, cooperative combined picker and husker roll elements mounted on said shafts, gathering mechanism adjacent the forward end of said rolls, a detachable conveyer having its forward portion below the husking roll portion of each pair of rolls and in position to receive husked ears from said husking rolls, said conveyers extending rearwardly beneath said rear axle support and between said rear traction wheels, said roll-carrying frames being detachable from said tractor independently of the corresponding husked ear conveyers, an elevating conveyer detachably mounted on the rear end of said tractor in position to receive husked corn discharged from both of said first conveyers and convey the same to an external point, a power takeoff connection from said engine, and driving connections from said power takeoff to said rolls, said gathering mechanism, said husked corn conveyers and said elevating conveyer.

28. In combination, a tractor comprising a frame carrying a power unit and having a rear axle support for a pair of laterally spaced traction wheels, a corn harvester attachment comprising a frame detachably mounted at each side of said tractor frame, a pair of cooperative forwardly extending combined picking and husking rolls mounted on each of said detachably mounted frames, a detachably mounted conveyer at each side of said tractor and having its forward end in position to receive husked corn after passage thereof from the adjacent pair of said rolls, each said conveyer extending and being operative to convey husked corn rearwardly between said traction wheels and beneath said rear axle support, and each said conveyer carrying at its rear end a driving shaft rotatably mounted on said conveyer, a torque connection between said conveyers and detachably connected to said driving shaft of each of said conveyers, and driving connections from said power unit to said harvester rolls and said driving shafts of said conveyers.

29. In a corn harvester, a supporting frame comprising a pair of spaced forwardly extending frame bars, a pair of forwardly extending harvester rolls carried by said frame bars, each of said rolls including a forward picking section and a rearwardly disposed husking section, and a bearing support for said rolls comprising a bearing housing carried by said frame bars rearwardly of said husking roll sections, said bearing housing being in separable parts formed with interior recesses, bearings seated in said recesses and carrying journal portions of said rolls, one of said bearing housing parts being provided with an interior recess at one end thereof, a spring disposed within said recess and bearing upon the adjacent roll bearing and yieldingly urging the latter toward the other roll bearing.

ED JOCHUMSEN.